United States Patent
Alexander (10) Patent No.: US 8,271,650 B2
(45) Date of Patent: Sep. 18, 2012

(54) SYSTEMS AND METHOD OF IDENTIFYING AND MANAGING ABUSIVE REQUESTS

(75) Inventor: James Alexander, Mount Kisco, NY (US)

(73) Assignee: Vizibility Inc., New York, NY (US)

( * ) Notice: Subject to any disclaimer, the term of this patent is extended or adjusted under 35 U.S.C. 154(b) by 0 days.

(21) Appl. No.: 13/441,793

(22) Filed: Apr. 6, 2012

(65) Prior Publication Data

US 2012/0191855 A1    Jul. 26, 2012

Related U.S. Application Data (63) Continuation-in-part of application No. 13/304,521, filed on Nov. 25, 2011, which is a continuation-in-part of application No. 13/190,322, filed on Jul. 25, 2011, now abandoned, which is a continuation-in-part of application No. 12/847,077, filed on Jul. 30, 2010, now Pat. No. 7,987,173, said application No. 13/304,521 is a continuation-in-part of application No. 12/795,034, filed on Jun. 7, 2010, now Pat. No. 7,831,609.

(60) Provisional application No. 61/350,712, filed on Jun. 2, 2010, provisional application No. 61/236,630, filed on Aug. 25, 2009, provisional application No. 61/348,558, filed on May 26, 2010, provisional application No. 61/452,585, filed on Mar. 14, 2011.

(51) Int. Cl.
G06F 15/173    (2006.01)
G06F 12/00    (2006.01)

(52) U.S. Cl. ....................................... 709/225

(58) Field of Classification Search ........ 709/223–229, 709/250
See application file for complete search history.

(56) References Cited

U.S. PATENT DOCUMENTS

| | | | |
|---|---|---|---|
| 2007/0078936 A1* | 4/2007 | Quinlan et al. | 709/206 |
| 2009/0199228 A1* | 8/2009 | Novak et al. | 725/25 |
| 2010/0251369 A1* | 9/2010 | Grant | 726/23 |
| 2010/0316300 A1* | 12/2010 | Epshtein et al. | 382/229 |
| 2011/0289116 A1 | 11/2011 | Horadan | |
| 2012/0084423 A1* | 4/2012 | McGleenon | 709/223 |
| 2012/0096261 A1* | 4/2012 | Ko et al. | 713/168 |

* cited by examiner

Primary Examiner — Zarni Maung
(74) Attorney, Agent, or Firm — Novak Druce + Quigg LLP (57) ABSTRACT

Aspects relate to categorizing requests for online resources as originating from spiders or not. Such resources are associated with respective contacts, and if a non-spider requests a resource, then a contact associated with that resource can be notified. One example method for determining whether to notify a user associated with a network resource includes identifying, via a processor, an entity making a request for a resource associated with a network address, wherein the entity has extracted the network address from a machine-readable code. The method then includes serving the resource to the entity in response to the request. The method then includes determining if request is not abusive, and only if the request is not abusive sending a notification to a user associated with the resource that the resource has been accessed.

2 Claims, 10 Drawing Sheets

SYSTEMS AND METHOD OF IDENTIFYING AND MANAGING ABUSIVE REQUESTS

CROSS REFERENCE TO RELATED APPLICATIONS

This application is a continuation-in-part of U.S. patent application Ser. No. 13/304,521, filed on 11 Nov. 2011, which is a continuation-in-part of U.S. patent application Ser. No. 13/190,322, filed on 25 Jul. 2011, which is a continuation-in-part of U.S. patent application Ser. No. 12/847,077, filed on Jul. 30, 2010, which claims priority from and incorporates U.S. Prov. App. No. 61/350,712, entitled "SYSTEMS AND METHODS OF HANDLING INTERNET SPIDERS," filed on Jun. 2, 2010 and which is a continuation-in-part of U.S. patent application Ser. No. 12/795,034, filed on Jun. 7, 2010, which claims priority from and incorporates U.S. Prov. App. No. 61/236,630, entitled "SYSTEM AND METHOD FOR SEARCHING, FORMULATING, DISTRIBUTING AND MONITORING USAGE OF PREDEFINED INTERNET SEARCH QUERIES", filed on Aug. 25, 2009, and from U.S. Prov. App. No. 61/348,558, entitled "SYSTEM AND METHOD FOR SEARCHING, FORMULATING, DISTRIBUTING AND MONITORING USAGE OF PREDEFINED INTERNET SEARCH QUERIES", filed on May 26, 2010; this application also claims priority to U.S. Prov. App. No. 61/452,585, entitled "SELECTION AND SHARING OF VERIFIED SEARCH RESULTS," filed on Mar. 14, 2011; all applications identified are incorporated by reference in their entirety, for all purposes, herein.

BACKGROUND

1. Field

Aspects disclosed herein relate to information searching, and more particularly to systems and methods of identifying and managing abusive requests.

2. Related Art

Internet users are increasingly finding navigating document collections to be difficult because of the increasing size of such collections. Likewise, companies, individuals and other organizations wishing to be found by Internet users face growing challenges with maintaining their online visibility. For example, it is estimated that the World Wide Web on the Internet includes more than 11 billion pages in the publicly indexable Web across more than 110 million web sites. Consequently, finding desired information in such a large collection, unless the identity, location, or characteristics of a specific document or search target are well known, can be much like looking for a needle in a haystack. The World Wide Web is a loosely interlinked collection of documents (mostly text and images) located on servers distributed over the Internet. Generally speaking, each document has an address, or Uniform Resource Locator (URL), in the exemplary form "http://www.server.net/directory/file.html". In that notation, the "http:" specifies the protocol by which the document is to be delivered, in this case the "HyperText Transport Protocol." The "www.server.net" specifies the name of a computer, or server, on which the document resides; "directory" refers to a directory or folder on the server in which the document resides; and "file.html" specifies the name of the file. URLs can be extremely long, complex strings of machine readable code.

Many documents on the Web are in markup language (e.g., HTML), which allows for formatting to be applied to the document, external content (such as images and other multimedia data types) to be introduced within the document, and "hotlinks" or "links" to other documents to be placed within the document, among other things. "Hotlinking" allows a user to navigate between documents on the Web simply by selecting an item of interest within a page. For example, a Web page about reprographic technology might have a hotlink to the Xerox corporate web site. By selecting the hotlink (often by clicking a marked word, image, or area with a pointing device, such as a mouse), the user's Web browser is instructed to follow the hotlink (usually via a URL, frequently invisible to the user, associated with the hotlink) and read a different document. A user cannot be expected to know or remember a URL for each and every document on the Internet, or even URLs for those documents in a smaller collection of preferred documents.

Accordingly, navigation assistance is not only helpful, but important for practical internet usage. Such navigation assistance is typically providing via an Internet based search engine, such as Google®, Microsoft's Bing®, Yahoo!® or the like. Accordingly, when an Internet user desires to find information about a company, individual or organization, the Internet user will frequently turn to a "search engine" to locate the information. A search engine serves as an index into the content stored on the Internet.

"Google" (www.google.com) is an example of a search engine. It operates in a similar manner to traditional keyword-based search engines, in that a search begins by the user's entry of one or more search terms used in a pattern-matching analysis of documents on the Web. It differs from traditional keyword-based search engines in that search results are ranked based on a metric of page "importance," which differs from the number of occurrences of the desired search terms (and simple variations upon that theme). Regardless of the proprietary nature of any given search engines' approach, Internet users searching for companies, individuals or organizations with similar characteristics (i.e. name, industry, etc.) often receive search results that are inaccurate, or relate to entities other than the intended search target. For example, a search for "John Smith", with the intention of obtaining information about a particular person by that name, will return many results about different "John Smith's, such that the desired John Smith may not have any relevant results. In these instances, the Internet user may build more complex search queries to generate more relevant results, which is only possible if the Internet user possesses information that can be used as a basis for such queries.

It is understood and well documented that it is desirable for companies, individuals and organizations to appear early in search results for personal, financial and other reasons. Prominence in search results for a given term or terms in search engines is a form of third party validation, at least in that Internet users place a higher value on entries in top search results because of their perceived relevance, success, and size. Therefore, viewership of search results or click throughs for search results on subsequent results pages declines precipitously.

Search Engine Optimization (SEO) has emerged as a category of services available to operators of web sites. SEO provides for deliberately engineering prominent placement in search results by tailoring web sites to the algorithms employed by a given search engine. In addition to SEO, 'paid search' may be utilized to display an advertisement on the top pages of search results for a given search term(s). SEO, paid search and other optimization strategies are typically only engaged by organizations due to their complexity and cost. Individuals have fewer options to achieve optimal placement in search results.

Google Profiles is one example of a mechanism individuals can utilize to offer information specific to themselves. Google Profiles does not influence search results, however, and individuals with even slightly common names often find themselves in a long list with others, eliminating the value of the feature. SEO, paid search, Google Profiles, and other similar optimization strategies are reactive in that they only influence but do not control what is returned in search results. These strategies are necessary because the natural search behavior of Internet users favors implementation of less sophisticated search queries or the Internet user simply does not possess the information necessary to build a complex search query that will allow the return of appropriately focused results. When companies, individuals or organizations with similar characteristics engage like optimization strategies, however, the differentiation gained from them diminishes and the value declines for them and Internet users alike.

Search engines employ machines (known as spiders or crawlers) that traverse Internet-accessible directories, web pages, and other information in order to determine location, content, and otherwise index resources that are available electronically. One way that machines traverse these electronic resources is by following links from one resource to another. In some cases, it may be desirable to differentiate between requests for resources generated by spiders from requests for resources generated by humans.

When a spider reaches a web site, it "crawls" through the links available at the site, following one link to another. For example, a home page or index can present a page that loads when a top level domain (e.g., www.vizibility.com) is requested, and the content of that page can be crawled by following all the links present on that home page, and continuing to recurse further into subpages until all the linked pages have been viewed by the spider.

As such, a web site can attempt to detect a spider by observing how machine(s) associated with a given IP address interacts with the links on the web site. For example, by detecting how quickly links are requested by the same IP address, non-human site navigation can be inferred. Given the heuristic nature of determining whether a given IP address is used by a spider, or shared by a group of people, or the like, further improvements to spider detection remain desirable.

SUMMARY

Resources are identified with respective URLs, and each resource is associated with a respective contact. URLs referencing the resources can be made available, and subjected to requests. A server, responsive to receiving requests for the resources can categorize a requesting entity as either a spider or not a spider, and responsively notify a contact associated with the resource, if the requester is not a spider. A whitelist specific to the resource can be maintained. If a requester is on the whitelist, then a notification can be provided, even if requesting behavior otherwise would suggest that the requester should be categorized as a spider. Requests can be generated by mobile devices that scan QR codes. Resources can comprise profiles that can be provided to such mobile devices and used to populate contact managers on such mobile devices.

One embodiment for determining whether to notify a user associated with a network resource includes identifying, via a processor, an entity making a request for a resource associated with a network address, wherein the entity has extracted the network address from a machine-readable code. The method then includes serving the resource to the entity in response to the request. The method then includes determining if request is not abusive, and only if the request is not abusive sending a notification to a user associated with the resource that the resource has been accessed.

BRIEF DESCRIPTION OF THE DRAWINGS

Aspects according to this disclosure may be understood by reference to the following detailed description, which references the accompanying drawings, in which.

DESCRIPTION

As set forth above, an Internet site can have a number of pages that reference each other, or which otherwise have a browsable hierarchy or structure that makes page content available to those who browse to the site. In some examples herein, terms including spidering and crawling are used as examples of abusive data requests, and more generally herein, requests for resources (e.g., resources identified by respective URLs) can be identified as originating from abusive or unabusive requesters. As will become clearer from the disclosure, a variety of decisions can be undertaken in order to determine whether a given source of a request is to be categorized as an abusive requester or an unabusive requester, with one criterion being whether or not the requester appears to be exhibiting behaviors that are deemed to be those of a web crawler. Some example heuristics for categorizing requesters are explained; however, actions taken in response thereto are also described herein, and which can be taken independently of how the categorization was performed.

In one approach, a network-accessible resource has a number of resources that can be accessed (e.g., an Internet site can have a number of pages that each are referenced by a different URL). However, those pages or resources may be largely without references to each other, or be referenced by a page which would allow navigation to them.

For example, browsing to a top level domain of the site having the resources would not provide an index or other browsable structure, or otherwise contain linkages to or among those URLs. Therefore, a typical spider visiting such a site would not be presented with an expected browsable site. Such a site generally would be considered less useful for most applications or services than a typical approach to site construction, at least because users navigating to the home page would not be presented with the content available, or a way to navigate among the content. Such a structure is exemplary and not required, in that a content structure also can be provided, in addition to the structure described herein, as an example implementation.

In one approach, URLs referencing the content available at the domain are used on other domains that also can serve content, and themselves be visited by spiders. The presence of these URLs (instances of such URLs) on those different domains allows those URLs to be followed by spiders crawling links on those domains. When any of the URLs are followed, the spiders will request the resource identified by that URL from the domain. Where a plurality of such URLs are available on one or more other domains, multiple different URLs may be requested in a relatively short period of time.

In one example, each URL can reference a pre-defined query or profile for a person (or product, and so on), and that URL can be used on any number of other web pages to reference that pre-defined query. For example, such URLs can be used on social networking sites. If a number of different people have such URLs, then a spider crawling such a social network site will encounter, and follow a number of these different links. Similarly, a spider crawling a number of different web pages may encounter the same URL on a number of pages, and follow that URL repeatedly. For example, where a number of pages relate to a particular person, then a number of those pages may also have the URL referencing the pre-defined query for that person.

As such, the URLs referencing the same domain (or an interconnected/intercommunicating set of domains) can operate to attract spiders in such a way that their behavior can be viewed more globally than only what behavior they exhibit while crawling a single domain. In one implementation, the distribution of these URLs is accomplished by providing a capability for users to create search queries that are referenced by URLs, and then allowing those users to embed those URLs in a variety of web resources that they control. The following description provides further examples and other information concerning such implementations and approaches.

Figure 1:
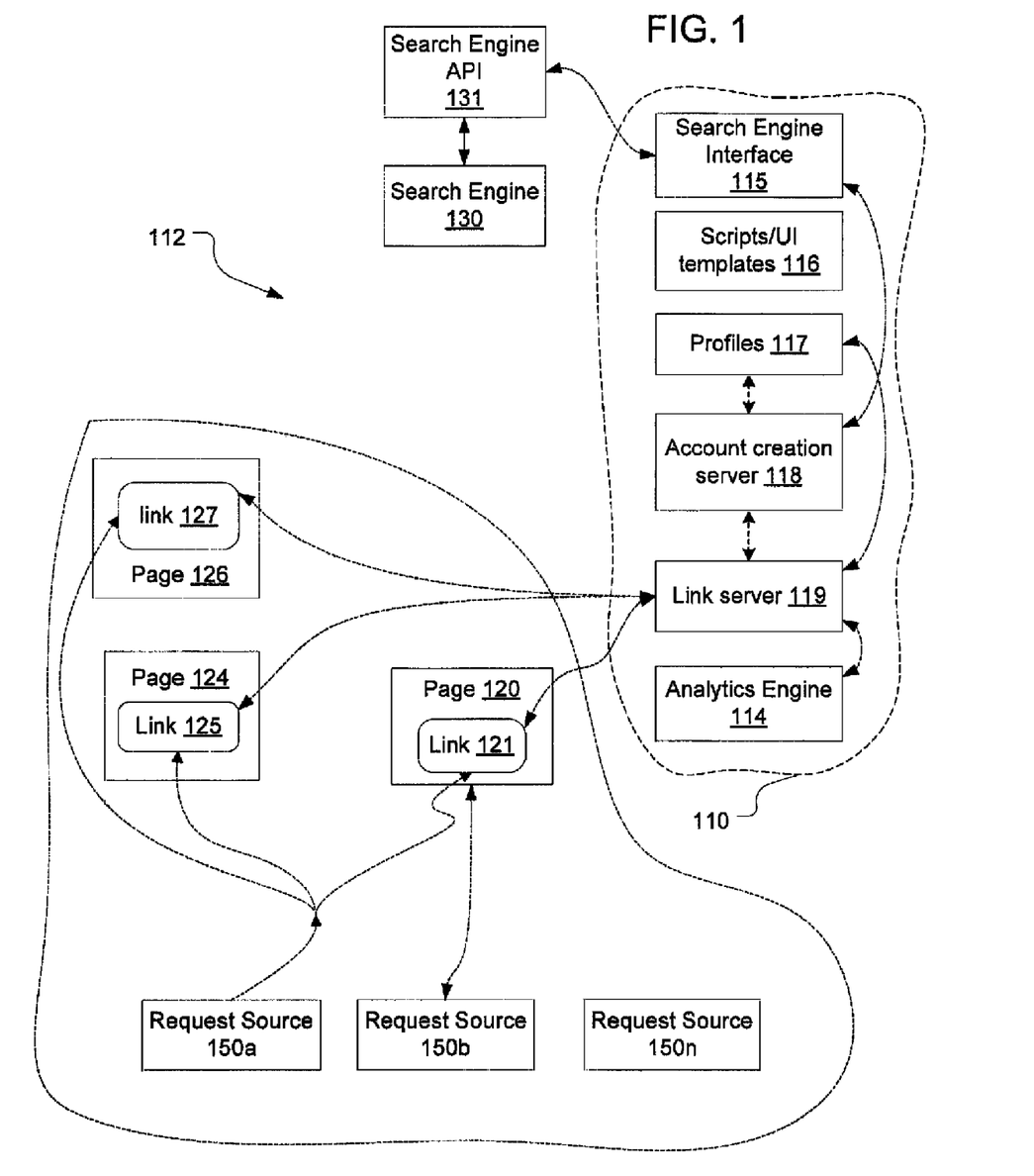
FIG. 1 depicts an arrangement of components and systems that will be referenced in describing aspects and examples according to the disclosure.

FIG. 1 depicts components of an internet-based example of a system in which aspects described herein can be practiced. Elements of the example depicted in FIG. 1 are introduced, followed by an overview of how the depicted system exemplifies the aspects of the disclosure. FIG. 1 depicts an internet 112 (e.g., the Internet), through which a variety of components, described below, may communicate with each other. One functional grouping of components is search query provider 110.

Search query provider 110 can be used by an entity (e.g., a person) to obtain a definition of a search query. A link or referenced to the query definition can be distributed to third parties, for use in obtaining information about a particular subject (e.g., the person who created the pre-defined query, an organization, object, place, concept, product, service, event, or the like). Because the query is defined prior to the time that it is used, typically by an entity other than an entity that is intended to use the query to obtain the information, such a search query can be called a "pre-search query", in that it is defined before a time when it is used by a person or entity to search for the topic or subject matter defined by the query (e.g., the query can be defined by one party, and then distributed to another party that uses it).

In other words, the query is defined by a process performed prior to distribution of the query (or references to the query) for use in searching. Typically, the query is defined with a view to tailoring the results that are returned from the query to a desired subject, as will be described below. For example, the query can be formed during a process performed in a machine, which may interact with a person. In one example, the process can be performed to define a query that will return search results about a selected person, and in such a case, the person intended to be the subject of the query may perform the process. In another example, if the query is intended to be for a product, then a marketing employee of a company producing or selling the product may initiate or engage in the query formation process for that product. To be clear, a pre-search query is not confined to being used only for people. Therefore, creation of a pre-search query for a person, as in the principal examples herein is for ease and clarity of explanation, and not by way of limitation.

Returning to search query provider 110, an example composition of search query provider 110 includes a search engine interface 115, which interfaces with one or more search engines (a search engine 130 is depicted), such as through respective Application Programming Interfaces (APIs) provided by the search engines (an API 131 for search engine 130 is depicted). search query provider 110 also has a store of scripts (e.g., javascripts) and UI templates 116, which as will be described below are for use in configuring a user interface located at a browser, which can be used (in this example) for creating a pre-search query (such scripts also can be run on other devices, such as on server resources). An account creation server 118 also is provided, and can include information gathering functionality that can be implemented through the UI on the browser.

A link server 119 is provided to accept requests for a resource identified by a link (e.g., a link 121 made available on a web resource (e.g., a page) 120), which can be selected or otherwise activated by a request source 150b, which is accessing web resource 120. An analytics engine 114 communicates with link server 119, and operates to obtain and analyze information available from such linking activities. In a particular example, a pre-search query can be referenced by link 121, such that when link 121 is activated (e.g., by clicking on a visual depiction of the link, in a page served by web resource 120 to request source 150b), information about request source 150b, such as information about a browser at request source 150b, an IP address, operating system, and so on, can be obtained.

As will be described further below, various constituent elements of search query provider 110 communicate with each other, in order to perform query definition steps delineated in the examples that follow. For example, account creation server 118 can store profile information in profile storage (profiles 117). Also, account creation server 118 can update link information on link server 119 (e.g., to publish a new link that can be used or otherwise distributed). Similarly, account creation server 118 may communicate with search engine interface 115 for providing trial queries to be submitted to search engine 130, and to receive results returned responsive to those queries.

FIG. 1 depicts that a link referring to such a query can be distributed to a number of different locations (locations in the sense of being distinct electronically accessible resources in their own right—e.g., a web page at a first domain, and a web page at a second domain would be two different locations). These links are separately numbered as links 121, 125 and 127, and instances of those links can be disposed on any number of web resources, such as pages 120, 124, and 126, as depicted. The enumerated links 121, 125, and 127 can reference the same query or different queries, or can even point to resources other than such pre-defined queries. The links can point to resources on (accessible through) a single Internet domain or multiple domains, so long as servers at each domain can communicate information about requests for the resources referenced by the links, as described below.

Because a given URL can be replicated a number of times, and located on any number of different web properties, or domains, each replication of the URL also can be referred to as an instance of that URL. In one aspect, the distribution of a number of instances of a given URL on different resources within a domain, or across a number of different domains, can be followed by spiders to a domain referenced in those URL instances. For example, a social networking site can have a number of pages (resources) maintained by a number of distinct members of the site. Each member can have a URL referencing a resource on a first domain (other than the domain hosting the social networking site); for example, each member can have a URL referencing a pre-defined search query definition located on a resource at the first domain.

As such, the enumerated links 121, 125, and 126 exemplify a situation where a number of links (e.g., Uniform Resource Locations (URLs) are defined and distributed to a plurality of different locations on the Internet (or an internet). These URLs link to resources available at one or more domains that can collect or otherwise reference information about requests that are made for the resources referenced by the links. In a more particular example, each link 121, 125 and 126 can refer to a pre-defined search query created to produce search results for a person at a pre-selected search engine.

FIG. 1 thus depicts that a number of sources of requests (request source 150a . . . 150n) can exist and make requests for the resources identified by the links 121, 125, and 127. These request sources 150a-150n can be humans or spiders. In one aspect, the following disclosure is directed to approaches to distinguishing between requests made by humans and those made by spiders, and from that information, take different actions for humans than for spiders. Such different actions can depend on the application or applications being implemented using the links or the resources referenced by the links.

In one particular application, a person or entity can create a pre-search query using Internet-accessible pre-search query search query provider 110, which can assist in creating a search query for a particular search engine that returns results that emphasize a certain concept, topic, or are focused on a particular person, or otherwise disambiguate search results. For example, a person can create a pre-search query for himself, such that submitting that pre-search query to a search engine will return results available from the Internet that are relevant to that person, and which also can emphasize selected aspects of those results, and exclude confusingly similar names.

Continuing with this example application, a definition of a pre-search query stored at link server 119 can be referenced by a URL (e.g., any of links 121, 125, and 127). Activating such link can cause a redirection to the search engine, and the submission of the pre-search query to the search engine. In another example, usage of the link can return the linked definition, and a requester can submit the query definition to the search engine and obtain the results.

As may be discerned, pre-search queries can be created by an individual or an entity to allow others to be informed quickly and easily about a topic, product, person, or organization, for example. As such, the creator of a given pre-search query may be interested in understanding when and by whom the pre-search query has been used. For example, an e-mail or Short Message System (SMS) message may be sent to the creator of a given pre-search query, responsive to activation of a link to the query. However, if such a notification system is to be implemented, creators of such pre-search queries may desire not to be notified when Internet spiders request the pre-search query while crawling a page on which a link to the query appears. Therefore, an approach to disambiguating between requests by humans or other entities of interest, and spiders can be useful.

To summarize, the links 121, 125, and 127 represent what could be hundreds, thousands, tens, or even hundreds of thousands of instances of the same link, and different links. For example, a number of instances of a link pointing to one pre-search query can be found at different locations on the Internet, even as a number of links pointing to other pre-search queries also can be found on the Internet. For example, a user can have a Facebook page and a LinkedIn page, on which instances of the same URL appear. Similarly, there are a number of users of Facebook and LinkedIn; each may have a distinct URL pointing to their respective pre-search query.

The following disclosure relates to example approaches to differentiating between spiders and requests that would generally be considered by most users to be more interesting (e.g., requests initiated by humans, and not spiders).

Figure 2:
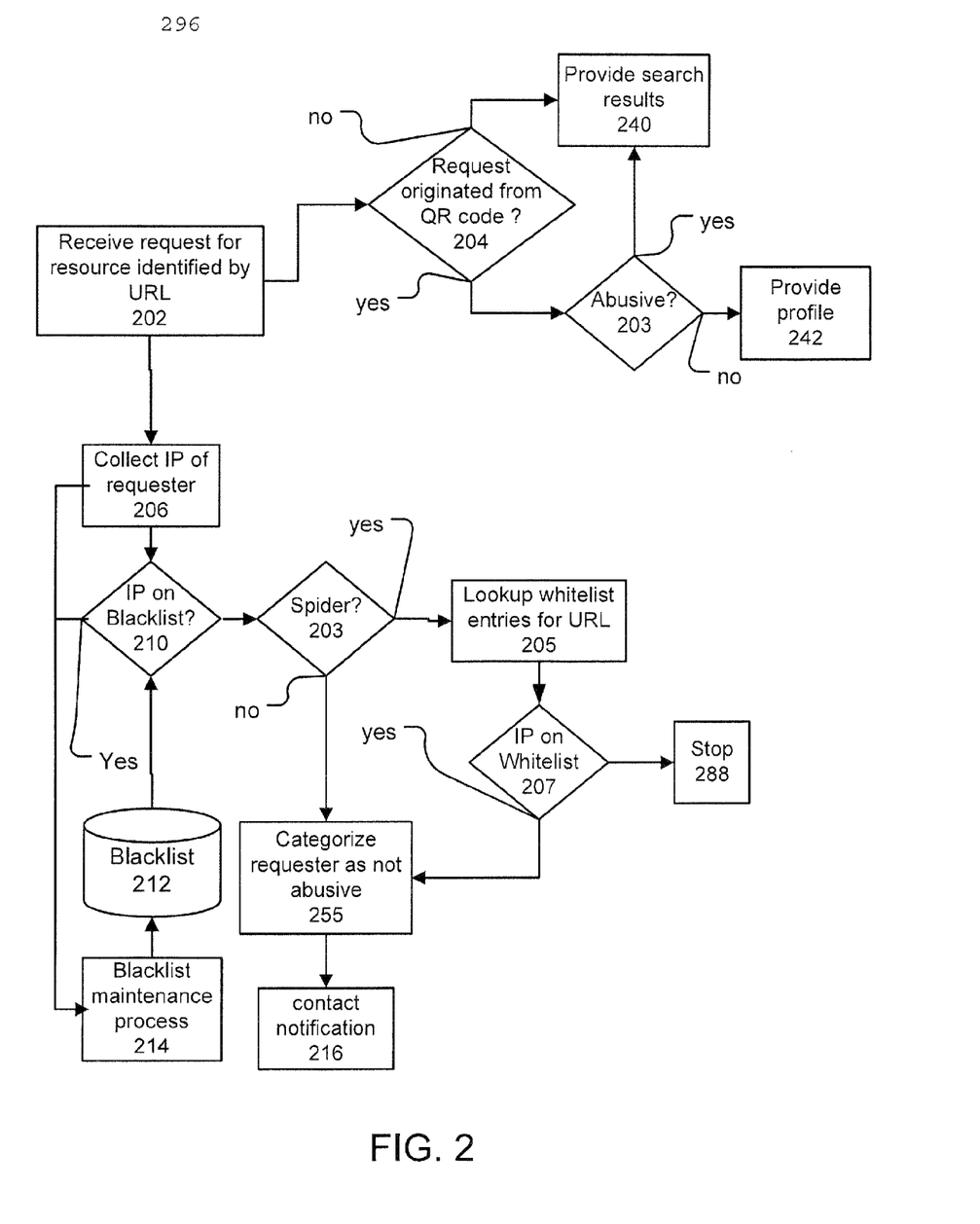
FIG. 2 depicts an example method in which spider behavior can be detected, and link requests can be responsively served.

FIG. 2 depicts a first method by which requests for resources identified/linked to a particular URL are processed. Such processing in an example comprises a notification portion 295 and a serving 296 portion. Notification portion 295 is an example of a process used to determine whether a contact associated with a particular resource requested should be notified of that request. The serving portion 296 is an example of a process to determine characteristics of information to be returned responsive to a particular request, or to select from among a plurality of resources that are associated with a particular contact, and return that selected resource. The depicted process includes receiving (202 a request for a resource. The example depicted characterizes the resource as being identified by a URL. However, any mechanism to uniquely identify a particular class of resources, or resources that are associated with a unique entity (e.g., a person or business) within the system can be used as an identifier or otherwise serve as the basis for identifying particular information requested. For example, an IPv6 address could be used. A block of such addresses can be assigned. Then, these IPv6 addresses can be encoded as would a URL according to these disclosures. By further example, a Uniform Resource Identifier according to W3C standards may be used. As such, those of ordinary skill would understand from these disclosures that an implementation may use any kind of identifier that has the characteristics of being able to be resolved to a particular serving entity (e.g., a particular group of web servers), and to a particular account for an entity (e.g., a person) maintained by the serving entity.

In one example, a categorization of the requesting entity as an abusive or an abusive requester is undertaken. Such process can include obtaining (206) identifying information (such as an IP address) for the requester, and using such information (or a portion thereof) to lookup whitelist entries associated with the URL requested. Some of these whitelist entries can be common among all and/or subsets of URLs; others can be unique to that particular URL. The IP can be checked for inclusion in a blacklist, and if so then a blacklist maintenance process can be invoked (214), the resource may not be served and a contact associated with the entity may not be notified. In the example depicted here, even a blacklisted entity may be able to obtain at least some requested information; however, this decision is implementation specific, and those of ordinary skill may determine whether or not to condition information delivery on absence from a blacklist, or whether to even include a blacklist check.

If the IP address is not on the blacklist, then a check (203) concerning whether behavior of the requesting entity is indicative of a spider can be made. If behavior is not considered spiderlike, then a contact can be notified (216) of the request. If behavior is spiderlike, then a check (207) as to whether the IP address is found on a whitelist can be made. If the IP is found in a whitelist entry, then the contact can be notified (216). If the requester is not a spider or is on the whitelist, then it can be treated as non-abusive (255). If the IP is not on the whitelist, and is categorized as a spider, then the method can stop (288), rather than notifying a contact of the request.

In addition to the notification determination process (which, broadly speaking is conditioned on whether or not a given requester is categorized as an abusive requester—which can be a decision that is inclusive of whether or not the requester is on a whitelist), a determination concerning whether to serve the resource or not can be made, or in some cases, determining whether to serve a particular resource, based on a categorization of the requester as abusive or not. If a given request originated from a QR code (determination 204), and if the request is determined to be from an abusive requester, then the resource identified by the QR code is not provided. In one implementation, search results pre-selected, or search results returned according to a pre-defined search query can be returned (240). If the requester is not abusive, then a profile with more personal information can be returned (242). In some implementations, a profile can be referenced by a URL encoded in a QR code, while a pre-defined query, or pre-selected search results, or both can be referenced by a plaintext, easy to use URL. Thus, a given contact can include both a short, human readable URL that points to one set of information, such as a subset of publicly available information, and a resource referenced by a URL encoded in a QR code. These resources can be treated differently, for the sake of abusive requesters, in that information on the profile may not be publicly available, and therefor more sensitive. As such, it is to be understood that example implementations can include two major component operations, one of which is determining whether or not to notify a contact associated with an online resource or not, in response to a particular request for that online resource. The other is that depending on the nature of the source of the request and the resource, the resource may or may not be shared, or some limited form of the resource may be shared. In one example, a resource includes a pre-search query, pre-selected search results, and profile information, and depending on whether or not a given requester is determined abusive or not, some such information may be shared while other such information is not. In some instances, such information is divided among a plurality of resources, and an abusive requester may be denied access to a resource that is identified by a complex URL, which can be encoded in a QR code. In one example, QR codes can be placed on tangible items such as resumes or business cards. In summary of some aspects, a QR code can include a code with a complicated network resource identifier (e.g., a complicated URL—a complicated URL including URLs such as URLs that would not be easily remembered by an average person). Such resource identifier can link to a profile containing private information. In order to reduce a chance of unauthorized access to this private information by spiders for example (such as a spider crawling a QR code placed by a user on a web site), a process to distinguish between human authorized users and spiders is implemented. Spiders can be provided publicly available information, such as search results returned by a predefined query, while a device operated by a human to scan a QR code, such as a QR code on a business card, can be provided the private profile information, and other information, such as the publicly available information.

Figure 3:
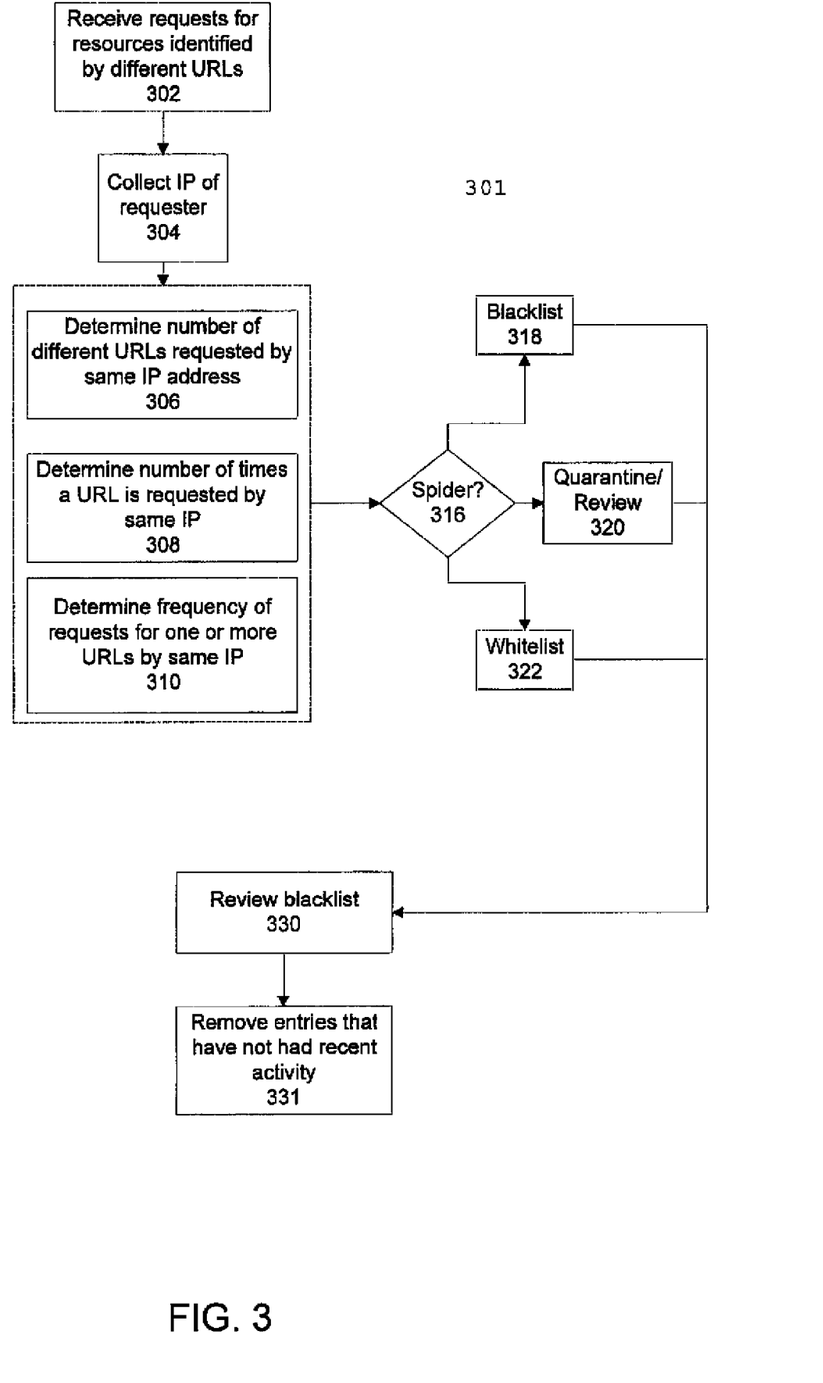
FIG. 3 depicts an example approach to maintaining a list of internet spiders that can be used as an input to the method of FIG. 2.
Figure 4:
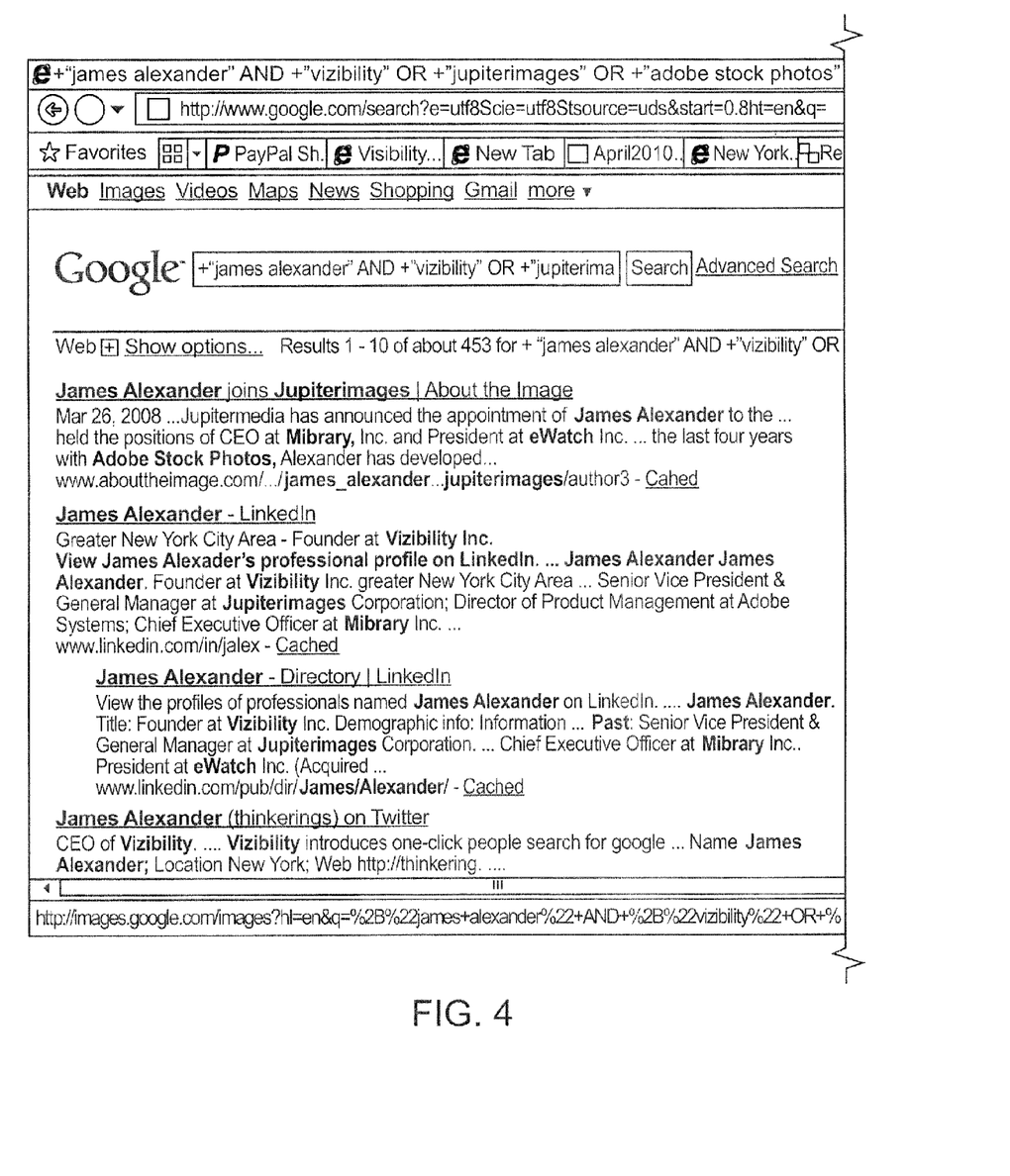
FIGS. 4 and 5 depict examples of interface elements that can be used in practicing the method of FIG. 2.
Figure 5:
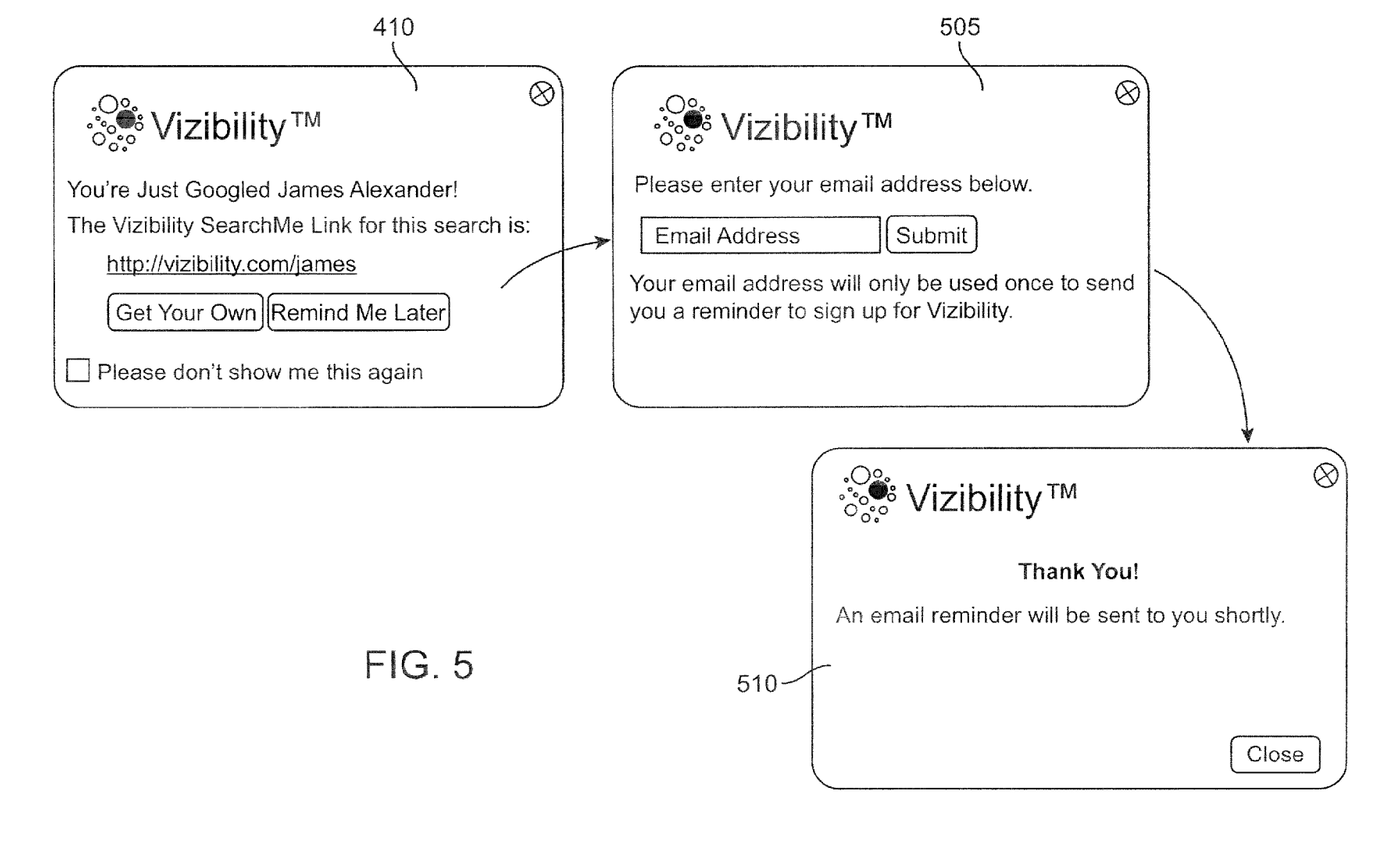

Now turning to FIG. 3, an example 301 of a blacklist maintenance process (214) is depicted, and described below. As described with respect to FIG. 2, requests for resources identified by different URLs (one example is multiple URLs, but some aspects herein also can be practiced based on requests for a single URL) can be received (302), and address information for the requesters is collected (304). A group of data gathering elements can be implemented, for example, a determination (306) of a number of different URLs that are requested by the same IP can be made.

Additionally, a determination (308) of a number of times a URL is requested by the same IP also can be made. Still further, a frequency of requests for one or more URL instances by the same IP can be determined (310). For example, a requester can cycle through a number of URLs at an abnormally rapid pace, while a person may also select a number of different URL's but at a slower pace. By particular example, a recruiter firm may have a limited number of IP addresses, and requests sourced from the firm may by simple numerosity be indicative of a spider, but a pattern of the requests may indicate differently. Also, request patterns and behavior of some requesters can be compared with that of other requesters, in order to gather information about whether a given IP address is used by a spider.

With information gathered, a determination as to whether a given IP address is used by a spider is made (316). The determination can be a trinary decision, where the request behavior indicates a strong likelihood that the IP is used by a spider, and that decision can result in blacklisting (318), while if the behavior is suspicious but not strongly correlated with spider behavior, the IP can be placed on a watch list for review (320), and if the behavior does not appear correlated with spider-type behavior, then the IP address can be added to a whitelist 322. Whitelist 322 also can be maintained by manual review. For example, certain entities may source an abnormally high number of requests from persons, or otherwise generate requests that are of interest to owners of the URLs. As such, it remains desirable to inform the owners when such requests are made. Therefore, known entities with these characteristics can be added to the whitelist. For example, employment agencies and recruiters can be added to the whitelist, and such manually added entries would take precedence over the automatic analysis, in most situations. Further, the whitelist can be consulted for a given IP prior to determination (316), in some implementations.

The whitelist referenced in response to receiving a request for a given resource (e.g., when a request for a particular URL is received) can be personal or specific to that URL. A portion of the whitelist can be common among a group of URLS, among all the URLs, while a respective portion can be specific to each URL. For example, in one implementation, each URL references a resource associated with particular contact information, and in one example, the contact information can be associated with an entity that curates the resource associated with the URL. For example, a person can maintain a profile, which is referenced by a particular URL. A whitelist for that particular URL can have entries that are specific to that URL, or are otherwise selected by or maintained by the person who maintains the profile. For example, IP addresses associated with the person who maintains the profile can be added to the whitelist for that profile/URL combination. So, in a particular example situation, if a person activates their URL a number of times from his person computer or mobile device, these activities might be considered spidering behavior according to this disclosure. However, where these IP addresses, or more generally, identifying information for these devices, has been added to a whitelist specific for this person, the person is still notified that their URL has been accessed.

As such, in one implementation, some entries of a whitelist may be shared among all URLs, some entries may be associated with particular classes of users, and some entries may be unique to respective users. Some entries may be maintained or populated by a system process, and other entries of specific whitelists may be populated or maintained by users associated with respective profiles linked to those whitelists. The system may establish default whitelist entries, which can be overridden by users according to their particular circumstances.

However, it may remain desirable to perform determinations according to the exemplary determinations 306, 308, and 310 regardless whether a requester IP is on the whitelist or not. For example, IP addresses may end up being used by different entities over time, such that it may be desirable to watch for changes in behavior that may require review (320) to be conducted again (or blacklisting to be considered again). In some examples, three requests by the same IP address on the same URL (from any number of instances of that URL) causes determination (316) to flag the IP address for review (320) (which also can be viewed as a quarantine list), while 8 clicks in 24 hours causes the IP address to be blacklisted (318). Similarly, the same IP address requesting 20 different links with a relatively small period of time, for example, 24 hours, or 12 hours triggers review or quarantining (320), and if 30 more requests originate from that IP within a follow on period of time, then the IP is blacklisted (318). By further example, 40 or 50 requests for any combination of URL instances would result in blacklisting (318). The concept is extensible to IP address ranges that have common ownership, or another reason why their behavior appears to be a federated or distributed spidering system. By having a larger number of links in the system, many of which may be concentrated on different pages of social networking sites, a large amount of request information can be collected and used to determine whether a given IP address is being used for crawling/spidering.

Further, a blacklist review process can be conducted (330), such as on a schedule. In one example, the blacklist is reviewed, and entries that have not had recent activity are removed (331) from the blacklist. In one approach, if spidering activity is not observed for a period of time (e.g., 3 days, 5 days, 10 days), for an IP address on the blacklist, that IP can be moved to a quarantine list, and after a further period of time elapses (e.g., 3 days, 5 days, 10 days), the IP can be removed from the quarantine. Thus, the lists can be more dynamic than typical static lists of IP addresses from which spidering activity was once detected. Preferably, however, spiders are added to the quarantine and blacklists quicker than they are removed.

In some aspects, an API can be provided by which an entity, such as a third party can request information about whether a given IP address is considered a spider. A list also can be published with such information.

Figure 7:
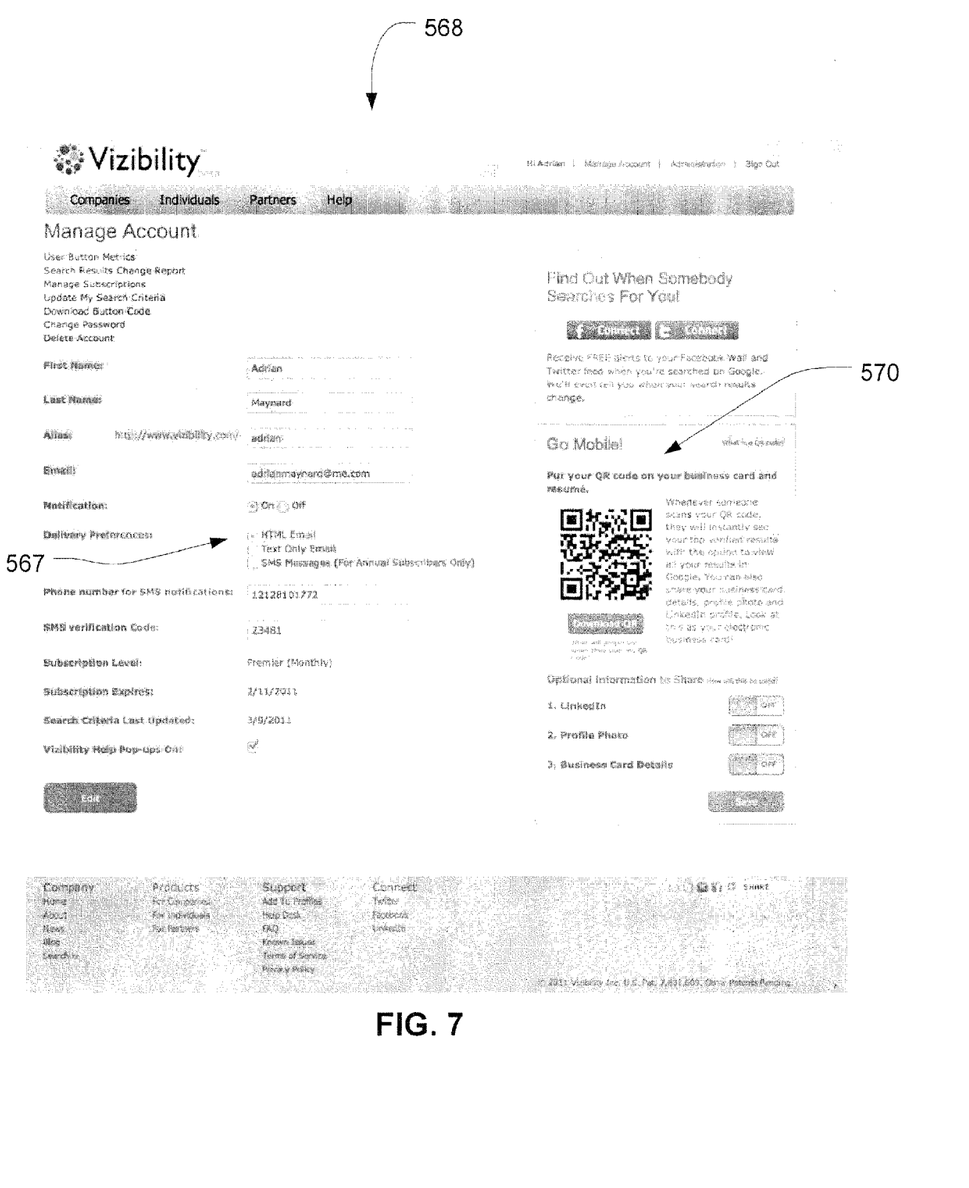
FIG. 7 depicts an example of creating a profile that can include a QR code for a particular entity, such profile can serve as a resource associated with a URL.
Figure 8:
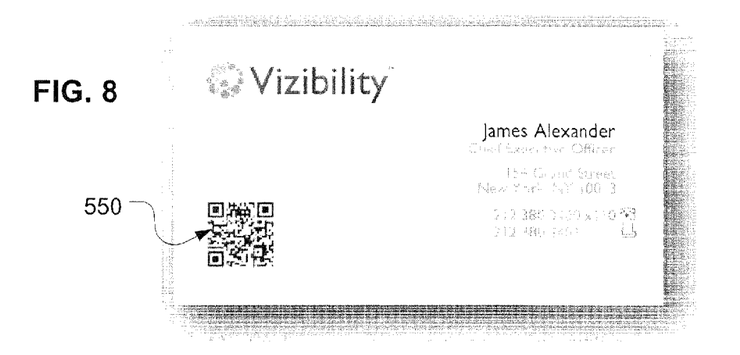
FIGS. 8-11 depict examples of information display on mobile device form factors relating to such profiles, and approaches to sharing information through such profiles.
Figure 9:
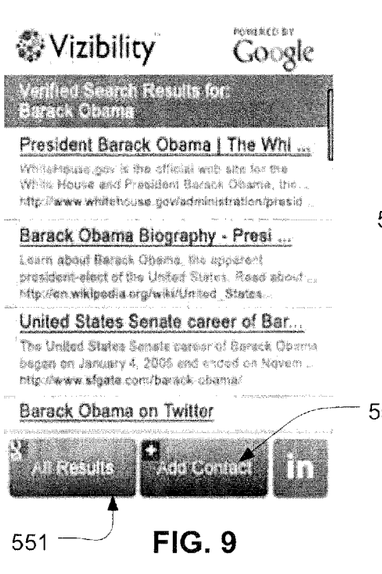
Figure 10:
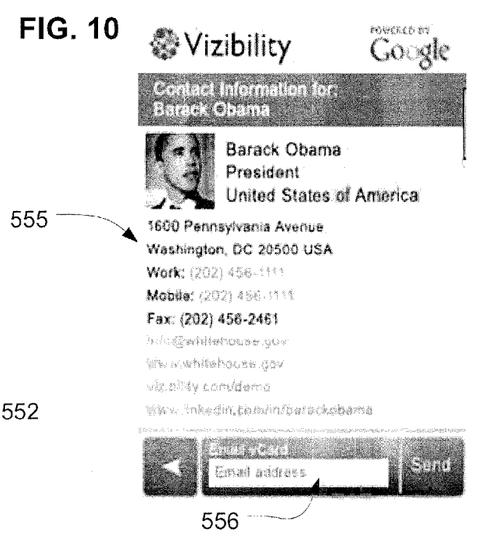
Figure 11:
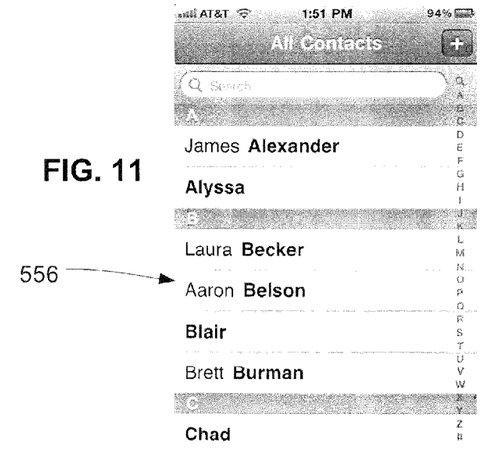

FIG. 7 depicts an example of creating a profile that can be linked to a URL, which is associated with contact information. FIG. 7 depicts, for example, that a preferred notification mechanism 567 can be selected, such as from text e-mail, instant message, and HTML formatted email. Of course, a variety of notification mechanisms or combination thereof can be provided. QR code creator 570 exemplifies a capability to select information to be encoded in a QR code that will be generated and made available to an entity creating the profile. For example, the QR code can be saved as a graphic, or imprinted on a business card. FIG. 8 depicts an example of a QR code 550 provided on a business card. Such a business card can be provided by a service provider linked to a service provider that is maintaining the association of the URL and the profile. FIGS. 9 and 10 depict examples of profiles that are formatted for a mobile device formfactor display. These profiles can include a display of verified search results, with an option to display all search results 551, and an option to add the user to a contact manager on the mobile device. FIG. 10 depicts an example where contact information 555 is provided, and a capability to cause an e-mail of a vcard to a particular email address can be provided. FIG. 11 depicts an example where a contact manager on a mobile device is updated based on the reception of contact information from such a profile. FIGS. 9-11 thus depict a situation where profile information such as contact information and selected search results can be made available at a device that is activating a URL linked to such information.

Figure 12:
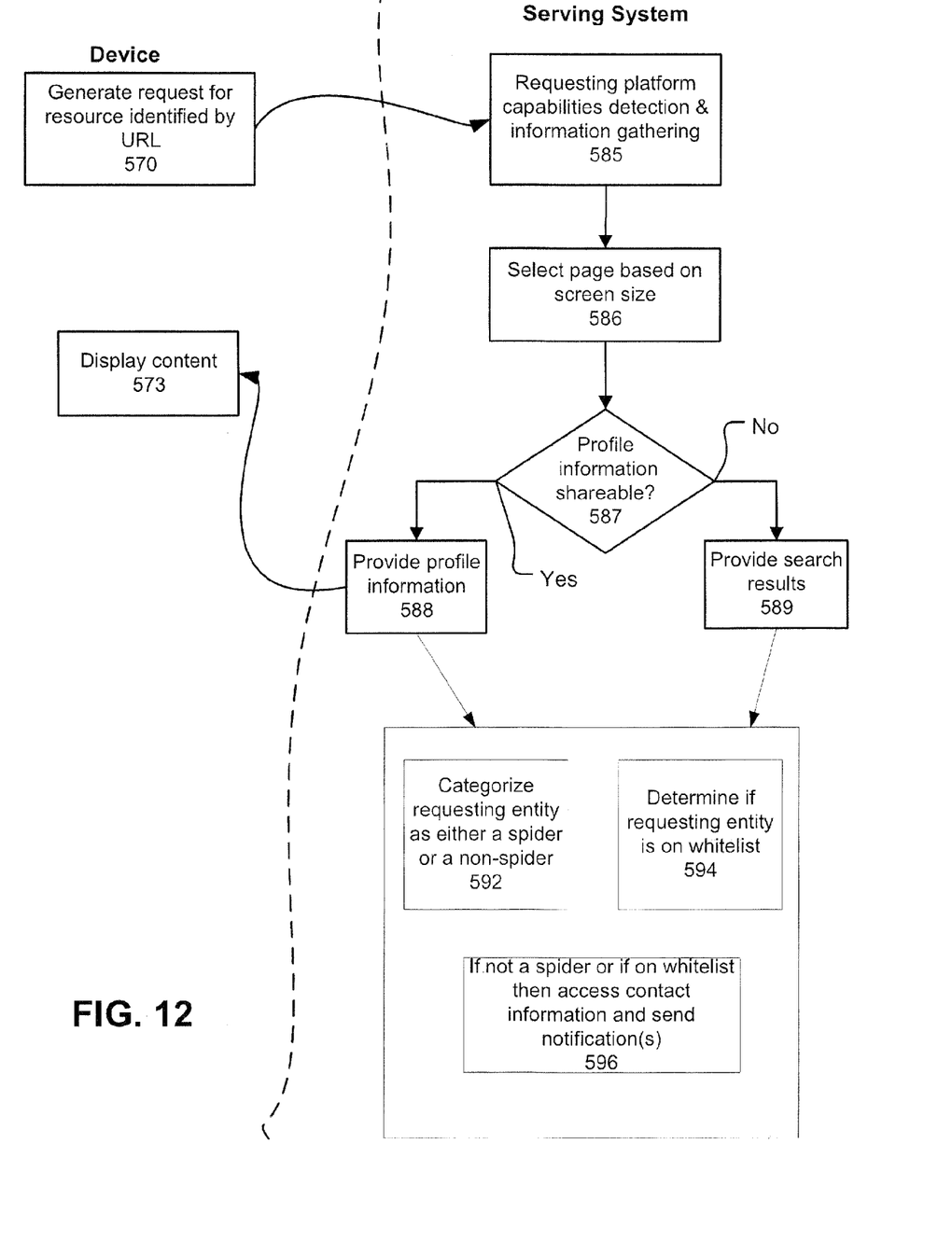
FIG. 12 depicts an example method for determining whether or not to notify a contact associated with a profile based on categorization of a requesting device as a spider or not a spider, and the option to use a whitelist specific to the resource associated with the URL that was requested (and which therefore can be maintained by a contact associated with such resource).

FIG. 12 depicts an example where a device (e.g., a mobile device) can activate such a URL (e.g., by scanning a QR code such as that of FIG. 8). The QR code encodes a network resource identifier (in these examples, a URL) that links to a serving system, which responds by obtaining/requesting capabilities of the mobile device and gathering information concerning a identity of such requesting device. A page size can be selected based on an estimated or provided screen size, and if profile information is sharable then such information can be provided (588) for display by the requesting device. If profile information is not shareable, then search results 589 can be provided instead (for example). Such information can be displayed (573) by the requesting device. In either case, a notification routine can be activated, which determines under what situations contact information is notified of the request. In one example, a categorization of the requesting entity as a spider or not a spider can be made 592. Also, a whitelist that can be specific for each profile can be maintained and consulted (594). If the requester is not categorized as a spider, or if the requester is on a whitelist, then a notification is sent (596). However, if the requester is categorized as a spider then a notification is not sent. If the requester is not on a whitelist, then the spider categorization controls. The whitelist determination can be provided before the spider categorization, concurrently with or after such categorization. Spider categorization also can use information about a requesting device. For example, if a requesting device is identified as a mobile device, then that device may be more likely not to be a spider. However, it can be the case that under some circumstances, such identifying information can be spoofed, therefore, even though a particular requesting device identifies itself as a mobile device, such identification need not be entirely determinative whether such a requester is considered a spider or not.

These examples specifically identify a QR code as an example of a machine readable code that can be used according to the aspects presented. However, implementations are not limited to using QR codes, but rather any kind of machine readable representation of a code can be used. For example, a bar code can be used to encode a network resource locator. Other examples include high capacity color barcodes (HCCB).

One embodiment for determining whether to notify a user associated with a network resource includes identifying, via a processor, an entity making a request for a resource associated with a network address, wherein the entity has extracted the network address from a machine-readable code. Some examples of machine readable codes include: a QR code, a Microsoft TAG, a matrix bar code; a wireless near-field communication signal, a RFID signal, a Bluetooth signal, a short-range wireless signal, and a uniquely identifiable image. This list is not exhaustive and other mediums capable of carrying a machine readable code can be used. The method then includes serving the resource to the entity in response to the request. In this embodiment, the resource is served to the entity regardless of any abusive nature of the request because the request includes a network resource, which was extracted from a machine-readable code. The method then includes determining if request is not abusive, and only if the request is not abusive sending a notification to a user associated with the resource that the resource has been accessed.

Some example methods for determining if a request is abusive by determining that a number of requests made by the entity during a predefined period of time is below a first predefined threshold number of requests, determining that a number of requests made by the entity from a predefined geo-region is below a second predefined threshold number of requests, and determining that a number of requests made by the entity during a predefined date and time is below a third predefined threshold number of requests.

As described above, determining that a request is abusive can include categorizing the entity as a spider, temporarily or permanently, to determine whether to activate a notification routine for a use associated with a requested network resource. Also, as described above, the notification routine can consider whether the requesting entity is on a white list, and always notify the user associated with the network resource of each request from the entity.

Figure 6:
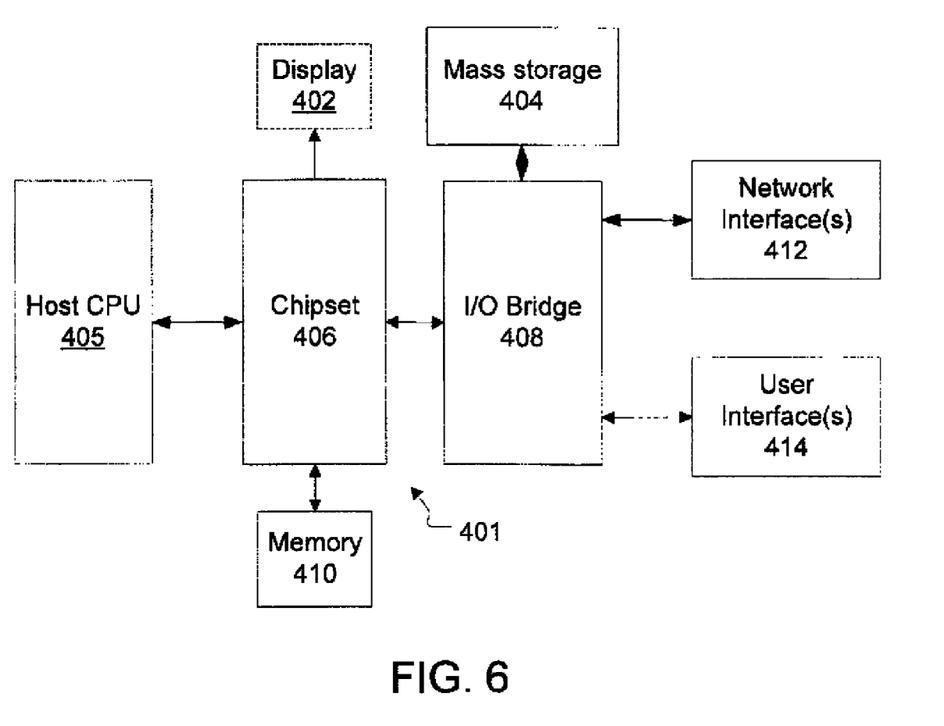
FIG. 6 depicts an example system to be used in implementing components and systems according to FIG. 1.

FIG. 6 depicts an example of a computer system 600 that can be used to implement described structural elements, such as the structural elements depicted in FIG. 1. By particular example, a computer system according to the example computer system 600 can be used in executing browsers 126 and 125, a number of such systems 600 can be employed at search engine 130, as well as at search query search query provider 110.

Example computer system 600 may include a host Central Processing Unit (CPU) (602), which may be implemented as a semiconductor containing one or more distinct microprocessor units, commonly called "cores", to indicate distinctness, but yet integration on a common substrate. Modern processors typically comprise multiple cores, such as 2, 4, 6, 8, 12 or more cores. Host CPU 602 also can be implemented with a plurality of physically separate microprocessor units, disposed in separate sockets. Host CPU 602 communicates with a chipset 604, which typically includes memory bus logic, and other interfaces to other functionality, such as an expansion bus for supporting I/O, such as network traffic to and from network interface(s) 614, mass storage 618 (e.g., hard drives), as well as peripherals, such as those that can be provided for a user interface (616). Example of such peripherals include a keyboard, serial I/O, a mouse, voice recognition inputs, touch screen inputs, and so on.

Chipset 604 also may support connection of a display 610, and therefore may include graphics logic for rendering content to be displayed. Such graphics logic may use main memory 608 as video memory, or a separate video memory may be provided. Where system 600 is used for implementing end-user computers, a display is more likely to be included. Frequently, if system 600 is functioning as a server, a display would not be provided.

Of course, the example system 600 is provided by way of example and not limitation as to what kinds of devices may be used in implementing aspects disclosed herein. Those of ordinary skill in the art may adapt the disclosures presented herein for use with a variety of devices, such as smartphones, tablet computers, laptops, and so on, which may be implemented using components that are more or less integrated than those depicted herein, and which may include more functionality or fewer functions than what is depicted in this example.

The separate identification of these components does not imply that the components are implemented separately. Also, the usage of certain programming techniques and paradigms are by way of example, rather than limitation, and a person of ordinary skill in the art can provide equivalent approaches in providing embodiments according to these disclosures.

Although illustrated embodiments of the present invention has been described, it should be understood that various changes, substitutions, and alterations can be made by one of ordinary skill in the art without departing from the scope of these disclosures.

I claim:

1. A computer-implemented method comprising:
   identifying, via a processor, an entity making a request for a resource associated with a network address, wherein the entity has extracted the network address from a machine readable code;
   serving the resource to the entity in response to the request; and
   determining if request is not abusive, and only if the request is not abusive sending a notification to a user associated with the resource that the resource has been accessed, wherein the determining if the request is not abusive is selected from the group consisting of:
   determining that a number of requests made by the entity during a predefined period of time is below a first predefined threshold number of requests, determining that a number of requests made by the entity from a predefined geo-region is below a second predefined threshold number of requests, and determining that a number of requests made by the entity during a predefined date and time is below a third predefined threshold number of requests.

2. The method of claim 1, wherein the machine-readable code is selected from the group consisting of: a QR code, a Microsoft TAG, a matrix bar code; a wireless near-field communication signal, a RFID signal, a Bluetooth signal, a short-range wireless signal, and a uniquely identifiable image.

* * * * *